United States Patent
Wang et al.

(10) Patent No.: US 10,013,299 B2
(45) Date of Patent: Jul. 3, 2018

(54) HANDLING CRASHES OF A DEVICE'S PERIPHERAL SUBSYSTEMS

(71) Applicant: Microsoft Technology Licensing, LLC, Redmond, WA (US)

(72) Inventors: Bin Wang, Bellevue, WA (US);
Pengxiang Zhao, Bellevue, WA (US);
Dejun Zhang, Redmond, WA (US);
Robert Yu Zhu, Bellevue, WA (US);
Ying Chin, Bellevue, WA (US);
Satyendra Bahadur, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 14/856,450

(22) Filed: Sep. 16, 2015

(65) Prior Publication Data
US 2017/0075745 A1   Mar. 16, 2017

(51) Int. Cl.
*G06F 11/07* (2006.01)

(52) U.S. Cl.
CPC ........ *G06F 11/079* (2013.01); *G06F 11/0745* (2013.01)

(58) Field of Classification Search
CPC ............. G06F 11/0724; G06F 11/0745; G06F 11/0778; G06F 11/079
See application file for complete search history.

(56) References Cited

U.S. PATENT DOCUMENTS

| | | | |
|---|---|---|---|
| 6,636,982 B1* | 10/2003 | Rowlands | G06F 11/0709 714/4.1 |
| 6,738,928 B1 | 5/2004 | Brown | |
| 6,880,113 B2 | 4/2005 | Anderson et al. | |
| 7,228,457 B2* | 6/2007 | Allue | G06F 11/2236 714/27 |
| 7,383,471 B2 | 6/2008 | Dall | |
| 8,132,057 B2 | 3/2012 | Jann et al. | |
| 8,453,015 B2 | 5/2013 | Ponnuswamy | |
| 8,495,422 B2 | 7/2013 | Mezhibovsky et al. | |
| 8,812,443 B2 | 8/2014 | Dewey et al. | |
| 8,959,402 B2 | 2/2015 | Giddi | |
| 9,104,619 B2* | 8/2015 | Chin | G06F 9/4418 |
| 2002/0152425 A1* | 10/2002 | Chaiken | G06F 11/0793 714/23 |
| 2005/0204199 A1 | 9/2005 | Harper et al. | |
| 2008/0201616 A1* | 8/2008 | Ashmore | G06F 11/0727 714/57 |
| 2009/0031166 A1 | 1/2009 | Kathail et al. | |

(Continued)

OTHER PUBLICATIONS

"Timeout Detection and Recovery (TDR)," Published on: Apr. 23, 2014, Available at: https://msdn.microsoft.com/en-us/library/windows/hardware/ff570087(v=vs.85).aspx.

(Continued)

Primary Examiner — Elmira Mehrmanesh
(74) Attorney, Agent, or Firm — Klarquist Sparkman, LLP

(57) ABSTRACT

A facility for responding to the crash of a computing system subsystem is described. The facility detects a crash of the subsystem. In response to this detecting, the facility provides diagnostic information representing state of the peripheral subsystem to a crash analysis service, and restarts the subsystem without restarting the computing system.

12 Claims, 5 Drawing Sheets

(56) References Cited

U.S. PATENT DOCUMENTS

| | | | | |
|---|---|---|---|---|
| 2009/0177807 A1* | 7/2009 | Wong | ................ | G06F 1/24 |
| | | | | 710/18 |
| 2009/0217078 A1* | 8/2009 | Cassett | ................ | H04W 24/04 |
| | | | | 714/2 |
| 2011/0035618 A1* | 2/2011 | Jann | ................ | G06F 11/0712 |
| | | | | 714/3 |
| 2011/0185161 A1* | 7/2011 | Chen | ................ | G06F 11/0757 |
| | | | | 713/1 |
| 2011/0202797 A1* | 8/2011 | Mezhibovsky | ................ | G06F 1/24 |
| | | | | 714/24 |
| 2012/0166893 A1 | 6/2012 | Chen et al. | | |
| 2013/0282951 A1 | 10/2013 | Kuo et al. | | |
| 2013/0290789 A1 | 10/2013 | Wen | | |
| 2013/0290790 A1 | 10/2013 | Kondou et al. | | |
| 2014/0068341 A1 | 3/2014 | Martineau et al. | | |
| 2014/0101467 A1* | 4/2014 | Jubran | ................ | H04L 41/0856 |
| | | | | 713/310 |

OTHER PUBLICATIONS

Ganapathi, et al., "Crash Data Collection: A Windows Case Study," In Proceedings of International Conference on Dependable Systems and Networks , Jun. 28, 2005, 6 pages.

"Creating Export Drivers," Retrieved on: Aug. 20, 2015 Available at: https://msdn.microsoft.com/en-us/library/windows/hardware/ff542891(v=vs.85).aspx.

\* cited by examiner

HANDLING CRASHES OF A DEVICE'S PERIPHERAL SUBSYSTEMS

BACKGROUND

Many smartphones and other battery-powered mobile devices are designed around hierarchical architectures in which a primary hardware unit that executes the operation system, apps, and other programs is supported by a number of "peripheral subsystems"—separate hardware resources that each provide specialized services, such as a cellular modem that encodes and decodes data for transmission via a cellular wireless network; a GPS subsystem that determines the geographic location of the device; a video subsystem that controls the display; a camera subsystem for capturing images; a wi-fi subsystem that interacts with other devices via a wi-fi or Bluetooth connection; etc. In many cases, the primary hardware unit is implemented as a System on a Chip ("SoC"), as are one or more of the peripheral subsystems. Each SoC generally has one or more processing cores (e.g., microprocessors, microcontrollers, or digital signal processors), a timing source, memory, and a bus. SoCs and other hardware arrangements implementing peripheral subsystems often also contain specialized hardware resources, such as radios, wired interfaces, electronic compasses, etc.

As part of its operation, each peripheral subsystem (hereafter simply "subsystem") may crash. The operating system executing on the main processor often has multiple ways of learning that a particular subsystem has crashed, such as being explicitly notified by the subsystem, being implicitly notified by the subsystem, or determining that the subsystem has not reset a watchdog timer on schedule. Conventionally, when the operating system learns that a particular subsystem has crashed, it first collects "telemetry data" for the crash (also called "diagnostic data")—status information that may help explain the reason for the crash, such as a "fatal error string" that seeks to describe the nature of the crash textually. The operating system then makes the telemetry data available for analysis, such as by sending the telemetry data to an analysis service such as the Windows Error Reporting service. As part of making the telemetry data available for analysis, the operating system reboots the main processor. The rebooting process restarts the device's subsystems, including the crashed subsystem. At the conclusion of this process, the crashed subsystem's normal functioning in support of the main processor generally resumes.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for responding to the crash of a computing system subsystem is described. The facility detects a crash of the subsystem. In response to this detecting, the facility provides diagnostic information representing state of the peripheral subsystem to a crash analysis service, and restarts the subsystem without restarting the computing system.

DETAILED DESCRIPTION

Figure 1:
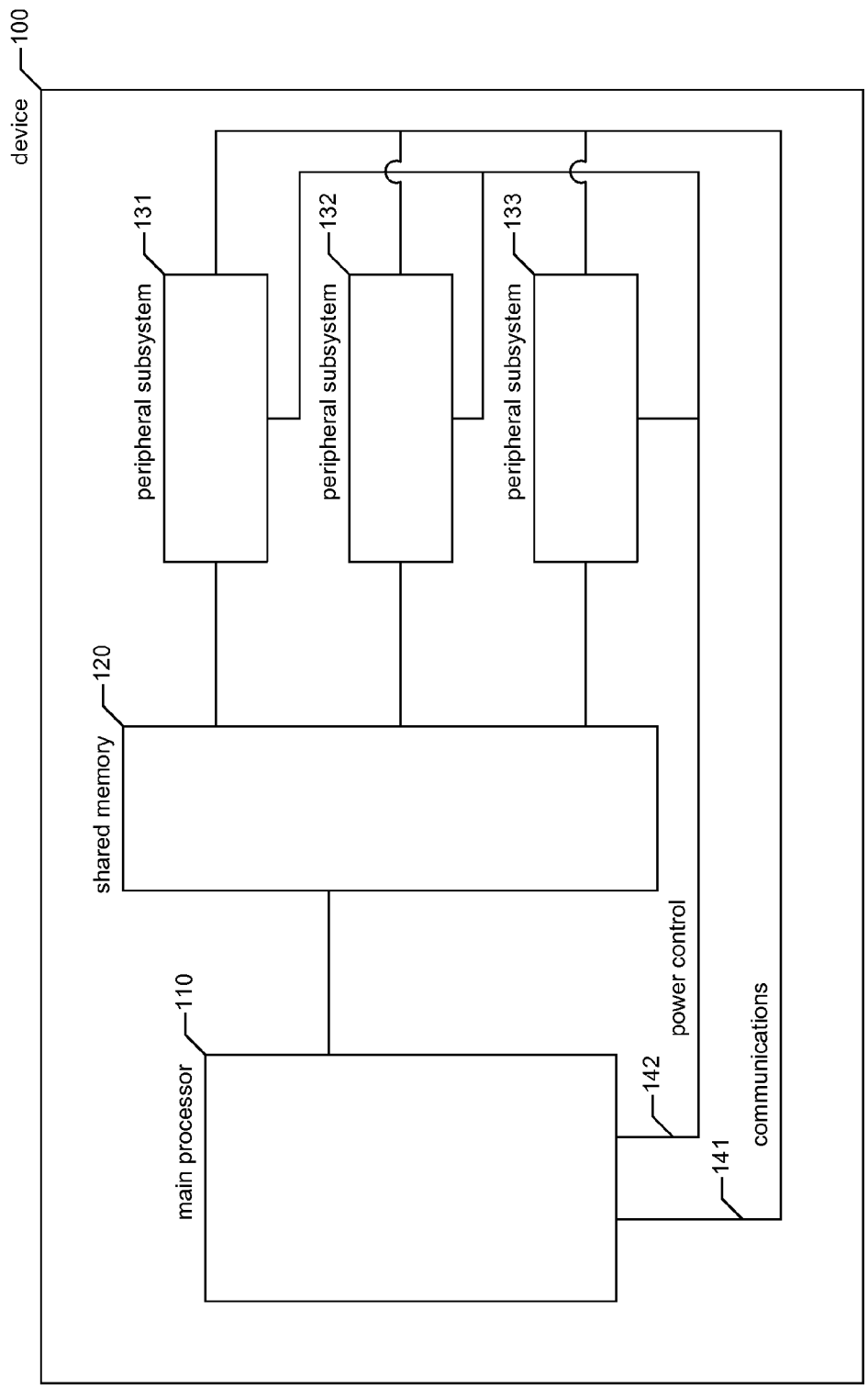
FIG. 1 is a block diagram showing components included in the device in some embodiments.

The inventors have recognized that the conventional approach to responding to subsystem crashes has significant disadvantages. First, rebooting the operating system in response to a subsystem crash adversely affects the user, who in many cases could, if the entire device was not rebooted, make valuable use of the device during the time that the crashed subsystem is unavailable. Also, the amount of telemetry data that the conventional approach makes available for analysis is sometimes too limited to be useful. Further, the particular telemetry data sent for a particular subsystem is typically not under the control of the subsystem.

In order to overcome these deficiencies of conventional approaches to responding to subsystem crashes, the inventors have conceived and reduced to practice a software and/or hardware facility for handling crashes of a device's peripheral subsystems without restarting the device ("the facility").

In some embodiments, a portion of the facility included as part of an operating system executing on a main processor or SoC ("main processor") learns of the crash of a subsystem. In various embodiments, the facility can learn of the crash of a subsystem by (1) being explicitly notified by the subsystem or its driver executing on the main processor; (2) noting that the subsystem has written diagnostic or telemetry data into a region of memory accessible to the main processor; or (3) noting that the subsystem has failed to timely reset a watchdog timer whose reset would indicate that the subsystem had not crashed.

In some embodiments, when the facility learns of a subsystem crash, it obtains diagnostic information for the subsystem such as by copying diagnostic information previously written by the subsystem, requesting diagnostic data from the subsystem, or otherwise triggering the subsystem to provide diagnostic data.

After obtaining diagnostic information for the subsystem, the facility restarts the subsystem without restarting (1) other subsystems of the device, (2) the main processor, or (3) the device as a whole. In some embodiments, the facility does this by controlling the supply of electrical energy to the subsystem, and in particular by suspending, then restoring the supply of electrical energy to the subsystem.

Also in response to obtaining diagnostic information for the subsystem, the facility submits diagnostic information obtained for the subsystem to a crash analysis service. In some embodiments, the facility submits a significant amount of diagnostic information, such as registers and/or a region of memory used by the subsystem. In some embodiments, the subsystem and/or its driver can control the set of diagnostic information submitted by the facility, such as by providing the contents of a region of memory used by the subsystem, or other "secondary data." In some embodiments, the facility manages the diagnostic information submitted, so as to conserve data transmission, storage, and/or analysis overhead when a particular subsystem is crashing with a certain level of frequency.

In some embodiments, the facility provides an Application Programming Interface ("API") made up of functions that can be called in order to effect and/or control the generation and submission of a subsystem crash report.

By performing in some or all of the ways described above, the facility enables the device to continue operation in the face of a subsystem failure; provides a greater volume of diagnostic information for the subsystem crash to a crash analysis service; enables the subsystem and/or its driver to control the set of diagnostic information that is transmitted; and exerts control over the rate at which full-sized crash reports are sent for a particular device and subsystem.

FIG. 1 is a block diagram showing components included in the device in some embodiments. In various embodiments, the device is of a variety of device types, including mobile phones, tablet computer systems, personal digital assistants, smart televisions, smart cameras, automobile computer systems, electronic media players, netbooks, laptop computer systems, desktop computer systems, server computer systems, etc. The device includes a main processor 110. In some embodiments, the main processor executes programs such as the operating system, device drivers for peripheral subsystems and other peripheral devices included in or connected to the device, application programs, utilities, etc. In some embodiments, the main processor is implemented as a system on a chip. In various embodiments, the main processor can employ any number of processing cores or other units of processing capability. In some embodiments, the main processor is connected to shared memory 120 that is shared with one or more peripheral subsystems, such as peripheral subsystems 131, 132, and 133. In various embodiments, peripheral subsystems included in the device can include, for example, a cellular modem subsystem, a GPS subsystem, a video subsystem, a camera subsystem, a wi-fi subsystem, etc. In various embodiments, instead of or in addition to accessing and storing data in the shared memory, the main processor and/or some or all of the peripheral subsystems have internal memory. In various embodiments, such internal memory may be accessible or inaccessible to other components within the device. A communications mechanism 141, such as a data bus, allows the main processor to communicate with the peripheral subsystems. Also, a power control mechanism 142, such as a power supply bus, enables the main processor to control the supply of electrical energy selectively to each of the peripheral subsystems, enabling the main processor to selectively restart any of the peripheral subsystems by interrupting, then restoring the electrical energy supplied to the peripheral subsystem.

Figure 2:
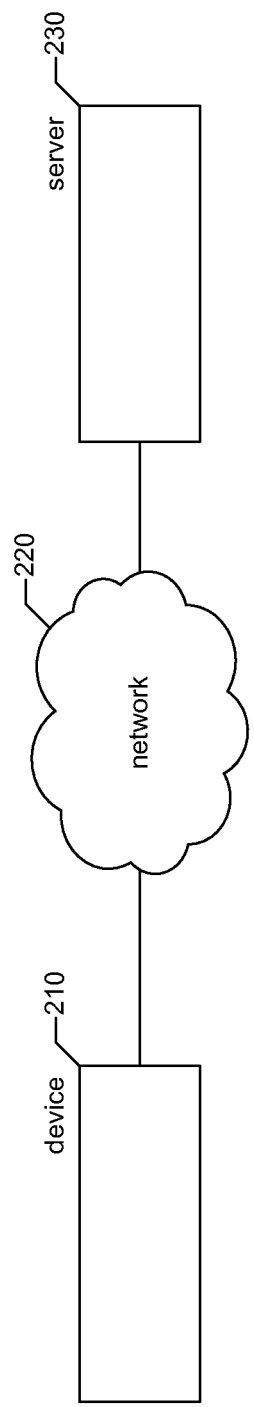
FIG. 2 is a network diagram showing an environment in which the facility operates in some embodiments.

FIG. 2 is a network diagram showing an environment in which the facility operates in some embodiments. The device 210 is connected via a network 220, such as the Internet, to one or more servers 230. When the device experiences a subsystem crash, the facility transmits information about the crash, including diagnostic information, to the server via the network. In some embodiments, the information about the crash is transmitted to the server on a push basis. In some embodiments, the information about the crash is transmitted to the server on a pull basis, in some cases based on a notification sent by the device to the server. The server can store and/or analyze this information to troubleshoot the particular reporting device, devices of the reporting device's type, the particular subsystem that crashed, software interacting with the subsystem that crashed, etc.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 3:
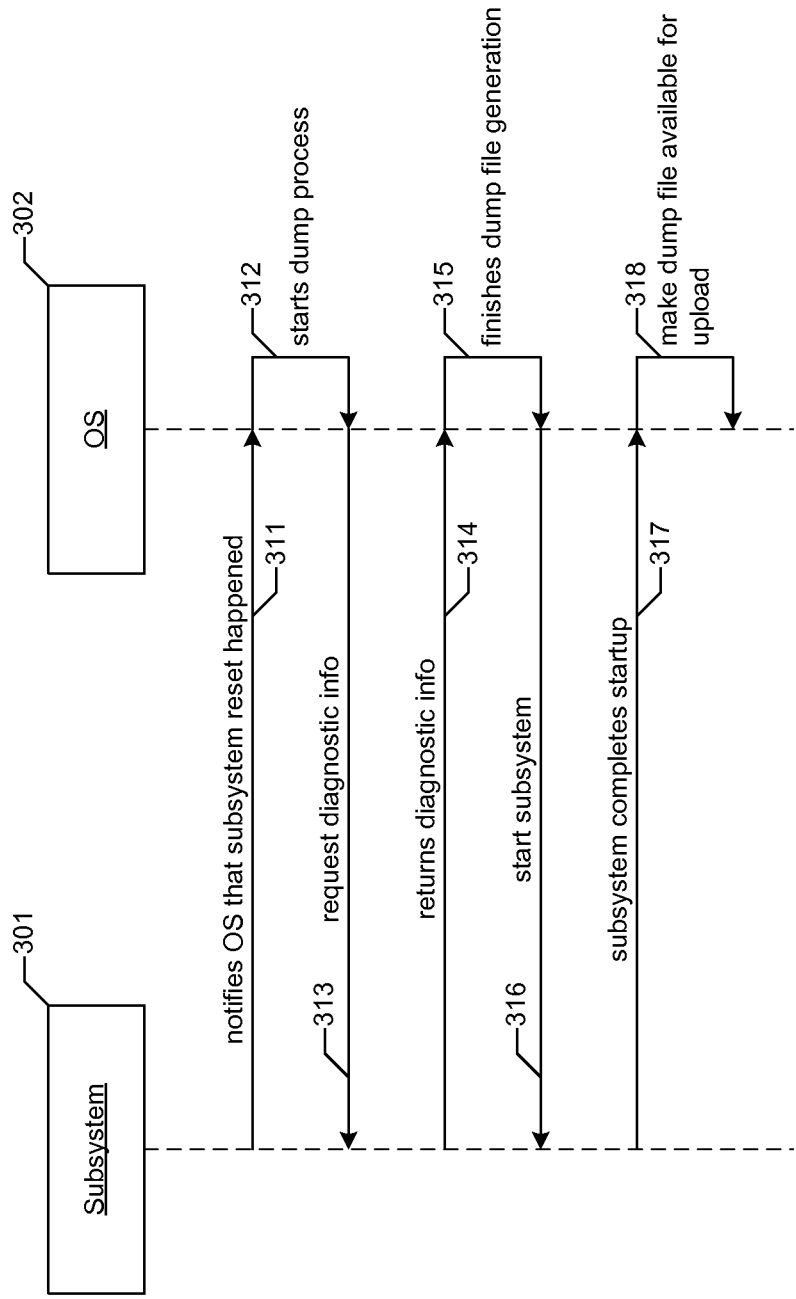
FIG. 3 is a data flow diagram showing the operation of the facility in some embodiments.

FIG. 3 is a data flow diagram showing the operation of the facility in some embodiments. In interaction 311, a subsystem notifies the operating system executing on the main processor that the subsystem has crashed and/or been reset. In response, the operating system starts 312 a dump process for collecting and transmitting diagnostic information for the subsystem. In interaction 313, the operating system requests diagnostic information from the subsystem. In interaction 314, the subsystem returns diagnostic information to the operating system. The operating system finishes 315 the generation of the dump file containing the subsystem's diagnostic information. In interaction 316, the operating system restarts the subsystem. In interaction 317, the subsystem completes its startup. The operating system handles 318 notification of the crash, such as by making the dump file available for uploading to the crash analysis service. During the process depicted, the subsystem that crashed is unavailable for a short time, while the main processor, the operating system, and the other subsystems continue to be available throughout in service of the device's user.

Figure 4:
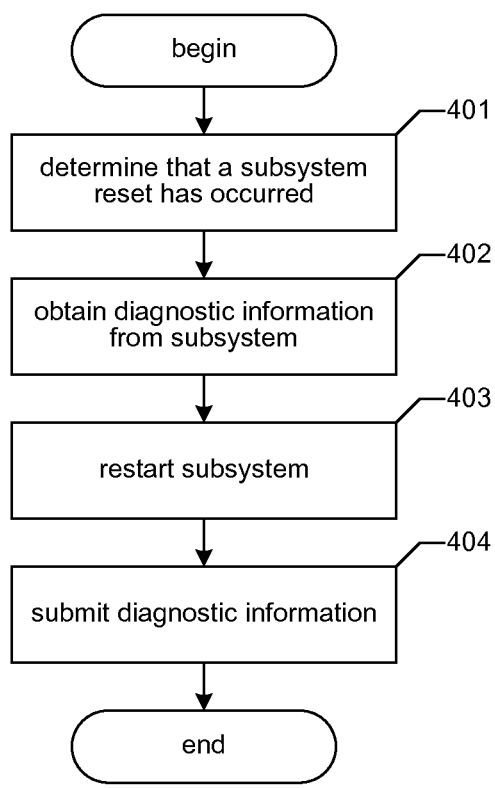
FIG. 4 is a flow diagram showing steps to typically performed by the facility in order to handle the crash of a subsystem.

FIG. 4 is a flow diagram showing steps typically performed by the facility in order to handle the crash of a subsystem. In step 401, the facility determines that a subsystem reset or crash has occurred. In some embodiments, the facility performs step 401 by being explicitly notified by the subsystem or its driver. In some embodiments, this explicit notification comes in the form of a call to a LkmdTelCreateReport function provided by the facility, such as by a call made by a kernel-mode driver framework ("KMDF") driver implemented for the subsystem. In some embodiments, when called, this function allocates an internal data structure to track the crash and populates the data structure with bug check parameters passed in as parameters of the function call. In some embodiments, the function further retrieves a crash context, and creates a dump file. In some embodiments, the facility learns of the subsystem's crash by determining that the subsystem has written diagnostic data into a region of memory that can be accessed by the main processor. In some embodiments, the facility determines that a crash has occurred by determining that the subsystem has failed to timely reset a watchdog timer that it would have reset had the subsystem not crashed.

In step 402, the facility obtains diagnostic information from the subsystem. As noted above, in a variety of embodiments, the facility obtains this diagnostic information in a variety of ways, including receiving this information in a call to a LkmdTelCreateReport function provided by the facility; copying diagnostic information already written by the subsystem; requesting that the subsystem provide diagnostic data; etc. In some embodiments, step 402 includes receiving a call to a LkmdTelSetSecondaryData function provided by the facility, such as from the subsystem's driver. Parameters of this function call specify a body of secondary data, such as data contained by a particular range of memory that is expected by the subsystem or its driver to be of use in diagnosing the crash.

In step 403, the facility restarts the subsystem, such as by cycling off and then on the supply of electrical energy to the subsystem. Restarting the subsystem generally restores the subsystem to a state in which it operates normally, and is no longer subject to its former crashed state.

In step 404, the facility makes diagnostic information it has obtained about the crash available to a crash analysis service. Details of step 404 are discussed below in connection with FIG. 5 below. In some embodiments, the facility submits the diagnostic information in response to a call to a LkmdTelSubmitReport function provided by the facility. In some embodiments, this function writes dump data to secure storage such as the system disk and either transmits the dump file to the crash reporting service, or notifies the crash reporting service that the dump file is available for retrieval. In some embodiments, a LkmdTelCloseHandle function provided by the facility is also called in order to free resources allocated to this crash. After step 404, these steps conclude.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 5:
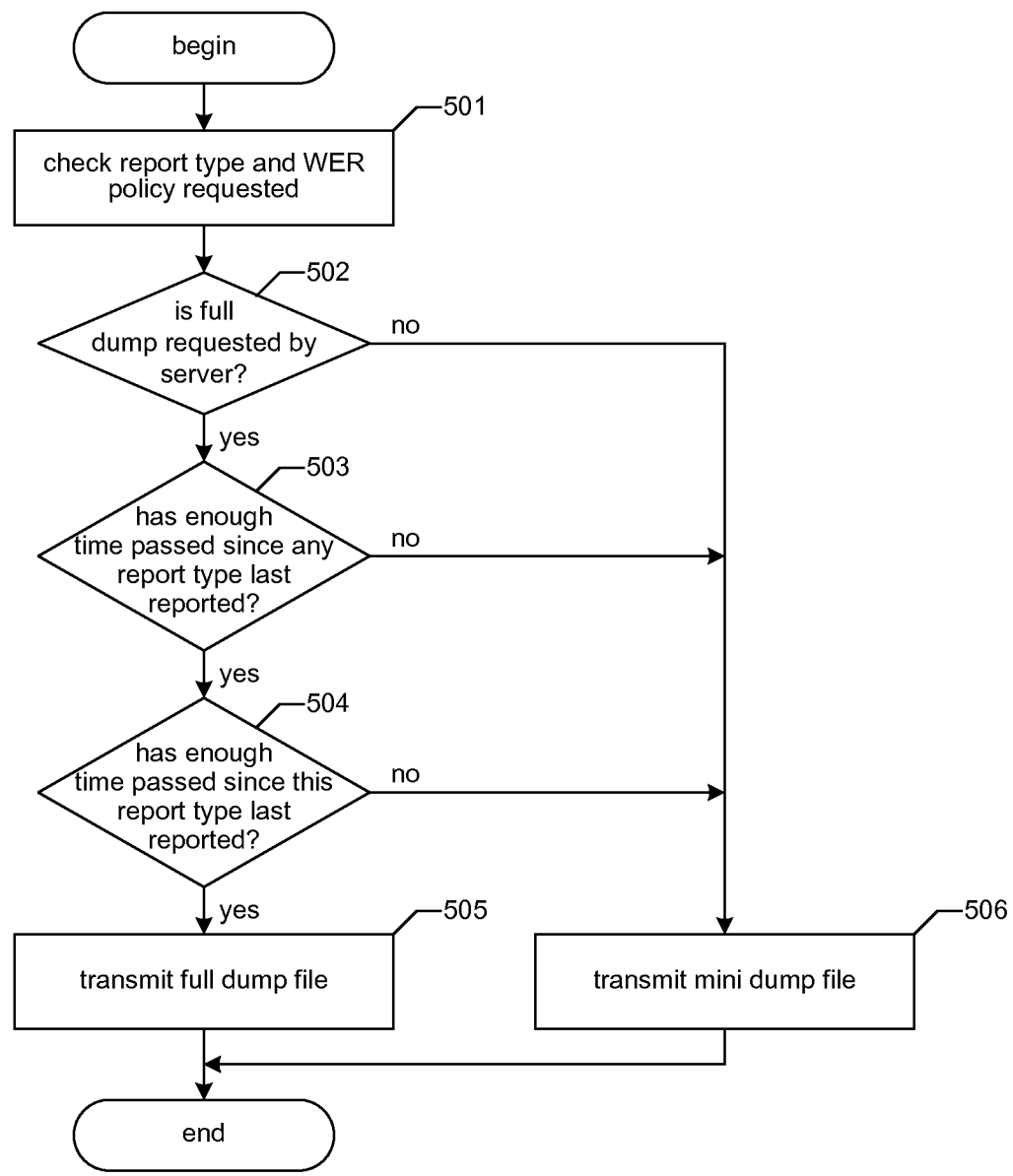
FIG. 5 is a flow diagram showing steps performed by the facility in some embodiments to select which data is sent to a crash analysis service.

FIG. 5 is a flow diagram showing steps performed by the facility in some embodiments to select which data is sent to a crash analysis service such as the Windows Error Reporting crash analysis service. In step 501, the facility checks two kinds of information: (1) the type of report corresponding to the crash, which in some embodiments corresponds to a reason category for the crash, such as an access violation, a thread runaway, an unresponsive subsystem, an out of sync subsystem, etc., and (2) a size of report requested, such as a size of report requested by the crash analysis service. In step 502, if a full dump is requested, then the facility continues in step 503, else the facility continues in step 506. In step 503 if the amount of time that has passed since the last crash report was sent to the crash analysis service exceeds a first time threshold, then the facility continues in steps 504, else the facility continues in step 506. In step 504, if the amount of time that has passed since a report of the current type was last sent as a full dump to the crash analysis service exceeds a second time threshold, then the facility continues in step 505, else the facility continues in step 506. In step 505, the facility makes available to the crash analysis service a full dump. In some embodiments, the full dump includes all of the information collected by the facility about the subsystem crash. After step 505, these steps conclude. In step 506, the facility makes a mini dump for the subsystem crash available to the crash analysis service. In various embodiments, this mini dump contains various proper subsets of all the information collected by the facility about the subsystem crash. In some embodiments, secondary data collected for the subsystem crash is not included, or is truncated to a certain size. In some embodiments, subsystem crash context information is not included, or is included to a limited extent. After step 506, these steps conclude.

In some embodiments, the facility provides a device, comprising: a peripheral subsystem whose normal operation is subject to interruption by crashes; and a primary hardware unit configured to: detect a crash of the peripheral subsystem; and, based at least in part upon detecting the crash, make available for a crash analysis service diagnostic information for the peripheral subsystem, without the primary hardware unit restarting.

In some embodiments, the facility provides a computer-readable medium having contents configured to cause a computing system having a peripheral subsystem to, in order to facilitate analysis of a crash by the peripheral subsystem: determine that the peripheral subsystem has crashed; based at least in part upon the determining: make diagnostic information describing the state of the peripheral subsystem available to a crash analysis service; and restart the peripheral subsystem, but not the computing system.

In some embodiments, the facility provides a method in a computing system for responding to the crash of a subsystem of the computing system, the method comprising: detecting a crash of the subsystem; in response to the detecting: providing diagnostic information representing state of the subsystem to a crash analysis service; and restarting peripheral subsystem without restarting the computing system.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A device, comprising:
a peripheral subsystem whose normal operation is subject to interruption by crashes; and
a primary hardware unit configured to:
   detect a crash of the peripheral subsystem;
   based at least in part upon detecting the crash:
      make available for a crash analysis service diagnostic information for the peripheral subsystem, without the primary hardware unit restarting;
      receive from the peripheral subsystem or a driver implemented for the peripheral subsystem a designation of secondary diagnostic information; and
      determine whether to include the designated secondary diagnostic information among the diagnostic information made available for the crash analysis service based at least in part on how recently diagnostic information provided to the crash analysis service for the peripheral subsystem has included secondary diagnostic information; and
a power supply bus for the peripheral subsystem configured for control by the primary hardware unit to enable the primary hardware unit to force a restart of the peripheral subsystem by cycling the supply of electrical energy to the peripheral subsystem in response to detecting the crash of the peripheral subsystem.

2. The device of claim 1 wherein the primary hardware unit comprises one or more processing cores configured to execute a device-level operating system.

3. The device of claim 1 wherein the primary hardware unit comprises a system on a chip configured to execute a device-level operating system.

4. The device of claim 1, further comprising a memory accessible to both the primary hardware unit and the peripheral subsystem,
wherein at least a portion of the diagnostic information made available for the crash analysis service is read from the memory by the primary hardware unit.

5. The device of claim 1 wherein the peripheral subsystem comprises a memory, wherein at least a portion of the diagnostic information made available for the crash analysis service is read from the memory.

6. The device of claim 1 wherein the primary hardware unit is further configured to control the frequency with which crash diagnostic information for the peripheral subsystem is made available for the crash analysis service.

7. The device of claim 1 wherein at least a portion of the diagnostic information made available for the crash analysis service is selected by the peripheral subsystem.

8. The device of claim 1 wherein the primary hardware unit is configured to execute a driver for the peripheral subsystem, and wherein at least a portion of the diagnostic information made available for the crash analysis service is selected by the driver for the peripheral subsystem.

9. A method in a computing system for responding to a crash of a subsystem of the computing system, the method comprising:
   detecting a crash of the subsystem;
   in response to the detecting:
      providing diagnostic information representing state of the subsystem to a crash analysis service;
      restarting the subsystem without restarting the computing system;
      receiving from the subsystem or a driver implemented for the subsystem a designation of secondary diagnostic information; and
      determining whether to include the designated secondary diagnostic information among the diagnostic information provided to the crash analysis service based at least in part on how recently diagnostic information provided to the crash analysis service for the subsystem has included secondary diagnostic information.

10. The method of claim 9, further comprising:
    receiving from the subsystem or a driver implemented for the subsystem a designation of secondary diagnostic information; and
    including the designated secondary diagnostic information among the diagnostic information provided to the crash analysis service.

11. The method of claim 9 wherein the computing system has a plurality of subsystems, further comprising:
    receiving from the subsystem or a driver implemented for the subsystem a designation of secondary diagnostic information; and
    determining whether to include the designated secondary diagnostic information among the diagnostic information provided to the crash analysis service based at least in part on how recently diagnostic information provided to the crash analysis service for any of the computing system's plurality of sub systems has included secondary diagnostic information.

12. The method of claim 9 wherein detecting a crash of the subsystem is based upon determining that the subsystem has failed to timely reset a watchdog timer.

\* \* \* \* \*